United States Patent [19]
Walsh et al.

[11] Patent Number: 5,812,233
[45] Date of Patent: Sep. 22, 1998

[54] POLARIZATION SENSITIVE DEVICES AND METHODS OF MANUFACTURE THEREOF

[75] Inventors: Kathryn Walsh, Reading; Gillian Margaret Davis, Oxfordshire; Paul May, Cambridge, all of United Kingdom

[73] Assignee: Sharp Kabushiki Kaisha, Osaka, Japan

[21] Appl. No.: 525,297

[22] Filed: Sep. 7, 1995

[30] Foreign Application Priority Data

Sep. 9, 1994 [GB] United Kingdom ............... 9418253

[51] Int. Cl.⁶ ................. G02F 1/1333; G02B 5/32; G02B 5/30
[52] U.S. Cl. ............... 349/194; 349/183; 349/191; 349/193; 359/3; 359/15; 359/488; 359/495; 430/1
[58] Field of Search ............... 349/96, 98, 183, 349/187, 193, 194, 191, 115; 359/1, 3, 500, 9, 576, 15, 569, 487, 488, 494, 495; 430/1, 20, 2

[56] References Cited

U.S. PATENT DOCUMENTS

| | | | |
|---|---|---|---|
| 3,610,729 | 10/1971 | Rogers | 350/157 |
| 3,622,220 | 11/1971 | Kogelnik | 359/3 |
| 4,412,719 | 11/1983 | Fienup | 359/15 |
| 4,983,479 | 1/1991 | Braer et al. | 430/20 |
| 4,993,789 | 2/1991 | Biles et al. | 350/3.7 |
| 5,105,298 | 4/1992 | Schellenberg | 359/3 |
| 5,153,670 | 10/1992 | Jannson et al. | 359/15 |
| 5,161,039 | 11/1992 | Schellenberg | 359/3 |
| 5,189,532 | 2/1993 | Ramsbottom | 359/9 |
| 5,198,912 | 3/1993 | Ingwall et al. | 359/3 |
| 5,243,449 | 9/1993 | Smith | 359/13 |
| 5,410,421 | 4/1995 | Huignard et al. | 359/15 |
| 5,621,547 | 4/1997 | Laiseaux et al. | 359/15 |

FOREIGN PATENT DOCUMENTS

| | | |
|---|---|---|
| 0404098 | 12/1990 | European Pat. Off. |
| 0547949 | 6/1993 | European Pat. Off. |
| 4360103 | 12/1992 | Japan |
| 5181401 | 7/1993 | Japan |
| 9209915 | 6/1992 | WIPO |

OTHER PUBLICATIONS

European Search Report for Application No. 95306328.6; Dated Mar. 27, 1997.

L.D. Dickson, et al., Applied Optics, vol. 33, No. 23, 1994, "Holographic Polarization–Separation Elements", pp. 5378–5385. No Date Provided.

Herwig Kogelnik, The Bell System Technical Journal, vol. 48, No. 9, Nov. 1969, "Coupled Wave Theory for Thick Hologram Gratings", pp. 2909–2947.

Search Report for U.K. Appl. 9418253.2, mailed Oct. 11, 1994.

Schadt et al, "Surface–Induced Parallel Alignment of Liquid Crystals by Linearly Ploymerized Photopolymers," Jpn. J. Appl. Phys. vol. 31 (1992) pp. 2155–2164. No Date Provided.

Shi et al, "Large Photoinduced Birefringence in an Optically Nonlinear Polyester Polymer", Appl. Phys. Lett 59 (23), 2 Dec. 1991, pp. 2935–2937.

"Volume Reflection Holograms," Press Syndicate of University of Cambridge, 1984, pp. 51–52, Optical Holography by P. Hariharan No Date Provided.

Primary Examiner—William L. Sikes
Assistant Examiner—Tai V. Duong

[57] ABSTRACT

A film of photosensitive material is illuminated from first and second sides with coherent polarized light so as to form an interference pattern within the film. Regions of cyclicly varying refractive index are provided in the film in accordance with the intensity of the interference patten, thereby forming an polarization sensitive refractive index grating. The refractive index grating may be used as a polarization and wavelength dependent mirror, patterned polarizer, beamsplitter or filter.

35 Claims, 6 Drawing Sheets

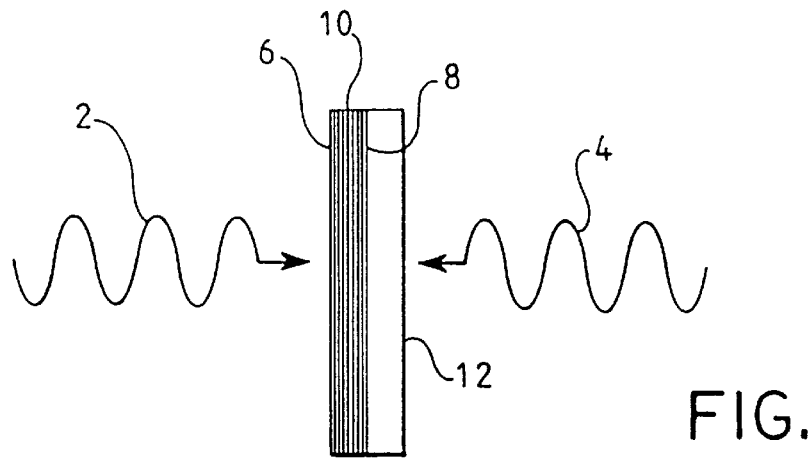
Recording of hologram by interference of two plane-polarised coherent beams
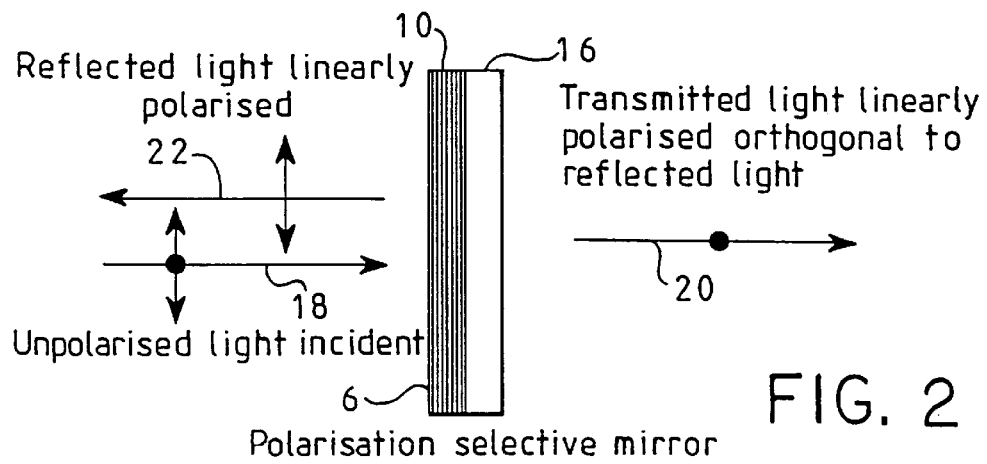
Polarisation selective mirror
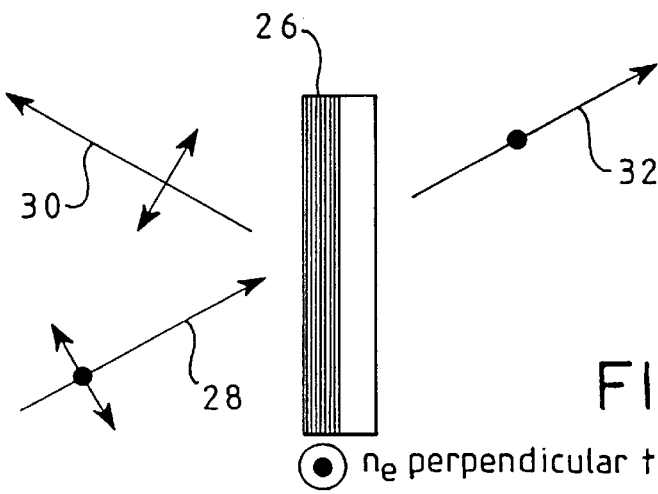
Large angle polarisation beam splitter

POLARIZATION SENSITIVE DEVICES AND METHODS OF MANUFACTURE THEREOF

FIELD OF THE INVENTION

The present invention relates to polarization sensitive devices and methods of manufacture thereof.

BACKGROUND OF THE INVENTION

JP 5181401 describes a method of fabricating a hologram comprising layers of a curable material between which a liquid crystal material is provided, the curable material and liquid crystal material being irradiated by two interfering beams before the curable material is fixed. Subsequently, the liquid crystal material is switchable.

A device is described in U.S. Pat. No. 5,198,912 which comprises a polymer matrix in which a hologram is written. After recording the hologram, microvoids in the matrix are filled with liquid crystal material. The properties of the hologram may then be varied, in use, by varying the alignment of the liquid crystal material, for example by applying an electric field thereto.

U.S. Pat. No. 4,983,479 describes a technique for fabricating an optical element. The technique involves providing a photopolymerizable liquid crystal monomer material on a substrate, applying an external force, e.g. a magnetic field, to the material in order to orientate the various parts of the material in the desired directions, and then curing the material by irradiating it.

U.S. Pat. No. 5,161,039 describes illuminating a first surface of a block of photopolymerizable material with polarized light so as to form a pattern of refractive index variations to the polarized light. The refractive index is spatially varying in a plane parallel to the surface of the material. This method is not very practical as it requires very high exposures and produces only small refractive index variations.

U.S. Pat. No. 3,610,729 discloses a polarizer comprising a stack of birefringent layers formed either by vacuum deposition or by co-extruding and stretch orientating. The thickness of each individual layer must be precisely controlled in order to realise an effective device. A large number of processing steps are required to fabricate such a device.

SUMMARY OF THE INVENTION

According to a first aspect of the invention there is provided a polarization sensitive device comprising a material having a first surface, the material having been written so as to define a first repeating pattern of refractive index variation to light of a first polarization, the repeating pattern extending along a direction substantially perpendicular to the first surface.

It is thus possible to define a repeating sequence of refractive index variations, the sequence running from the surface of the device into the bulk of the device. Furthermore, the variation of refractive index is polarization dependent.

The material may comprise a birefringent material which may have a substantially non-varying refractive index to light of a second polarization orthogonal to the first polarization. Alternatively the material may present a second continuous variation in refractive index to light of the second polarization. Preferably the material is a photopolymer. Advantageously the photopolymer is deposited as a film on a substrate. There may be a step like change of refractive index at the interface with the substrate. Examples of suitable photopolymers are polyvinyl 4-methoxycinnamate also known as PVMC, or a polysilane polymer, for example, poly-(di-n-hexylsilane) and poly-(di-n-pentylsilane). Alternatively the material may be a photosensitive dye, such as PE-DR 19. The dye may be incorporated within polymer, such as a polyester polymer. Further materials may include a liquid crystal polymer doped with PVMC or another material which exhibits photoinduced birefringence. Alternatively the liquid crystal polymer may exhibit photoinduced birefringence.

Alternatively, the material may comprise a liquid crystal material in which the pattern has been fixed.

First and second sides of the photosensitive material may be exposed to first and second coherent polarized lights so as to define a standing wave pattern within the first material. The standing wave pattern gives rise to repeated variation in the refractive index to polarized light of the photosensitive material. Areas of the photosensitive material may be masked during the writing process such that different regions of the material may have different spatial variations of refractive index formed therein. It is thus possible to spatially pattern the device, for example, to have spatially dependent polarization sensitive properties or spectral properties. The variations in refractive index form a holographic element. More than one hologram may be superimposed in a region of the device. It is thus possible to modify the optical properties of the device, for example, to extend the reflectivity bandwidth or the angular acceptance of the device.

The polarization sensitive device may be formed for use with linearly or circularly polarized light. The term "light" as used herein is used in an extended sense to include radiation falling within the infra-red, visible and ultra-violet regions of the electromagnetic spectrum.

Embodiments of the device may be used, amongst other things, as polarization sensitive beamsplitters, polarization sensitive reflectors and/or polarization sensitive colour filters, or patterned polarizers.

According to a second aspect of the invention there is provided a method for forming a polarization sensitive device, comprising the steps of optically writing a liquid crystal material having a first surface so as to define a first repeating pattern of refractive index variation to light of a first polarization, the repeating pattern extending along a direction substantially perpendicular to the first surface, and a subsequent step of fixing the liquid crystal material.

According to a third aspect of the present invention, there is provided a method of forming a polarization sensitive device, comprising illuminating first and second substantially parallel surfaces of a first material having photoinduced birefringence with first and second polarized coherent radiations, respectively, so as to define a first pattern of spatial variation in refractive index in the first material in accordance with an interference pattern between the first and second radiations.

Advantageously the first and second radiations are derived from a single source, such as a laser. The light from the source may be polarized and then split into two paths by a beamsplitter. The angle that the first and second radiations make with the first and second surfaces, respectively, may be selected so as to produce a device which is usable with selected wavelengths greater than the wavelength of the first and second radiations. The physical dimensions of the photosensitive material may be altered, for example, by stretching or compressing, after the pattern of refraction index variation has been written therein so as to modify the working properties of the device.

Preferably when fabricating a device for use with circularly polarized radiation and when illuminating the first and second surfaces with first and second radiations which are not normal with the surfaces, the first and second radiations are elliptically polarized. The use of elliptically polarized light enables the magnitude of a E field vector of the interference pattern to remain substantially constant. Birefringent elements, such as phase plates, may be used to convert linearly polarized light into elliptically polarized light. Soleil Babinet compensators may be used if an adjustable birefringence is required.

It is thus possible to record a holographic interference pattern as a birefringent grating within the first material. The refractive index of the first material is modified in accordance with both the intensity and polarization state of the incident light.

BRIEF DESCRIPTION OF THE DRAWINGS

The present invention will further be described, by way of example, with reference to the accompanying drawings, in which:

FIG. 1 schematically shows the recording of a hologram by arranging for two plane polarized coherent beams of light to be incident on opposing sides of a film of photopolymer;

FIG. 2 schematically illustrates a polarization selective mirror constituting an embodiment of the present invention;

FIG. 3 schematically illustrates a large angle polarization beamsplitter constituting a further embodiment of the present invention;

DETAILED DESCRIPTION OF THE INVENTION

Figure 4:
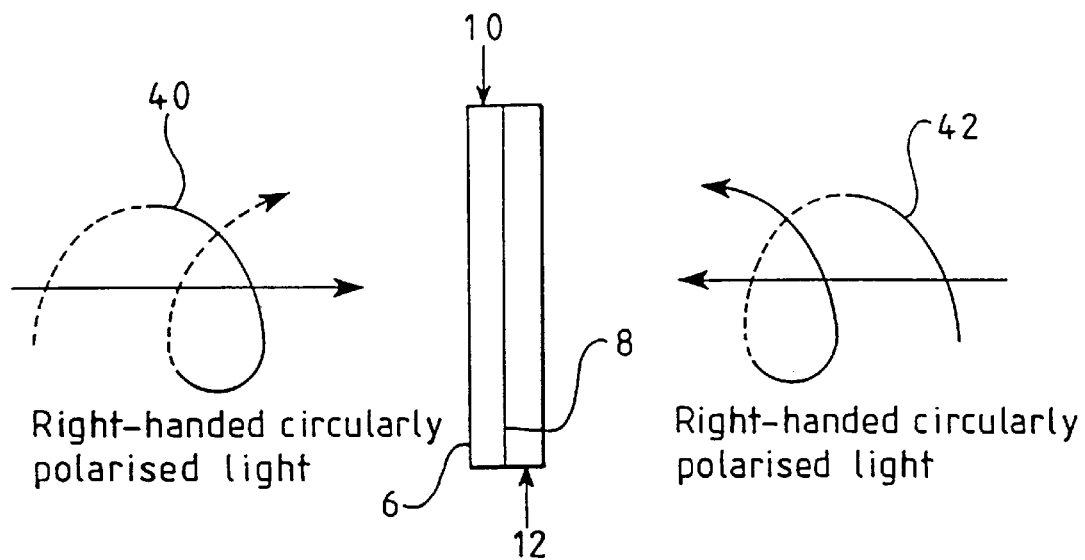
FIG. 4 schematically illustrates the recording of a hologram using circularly polarized light.

As shown in FIG. 1, first and second beams 2 and 4 of plane polarised coherent light are incident on first and second sides 6 and 8, respectively, of a film of photopolymer 10 carried on a transparent substrate 12. The light beams 2 and 4 create an interference pattern which causes the properties of the photopolymer to become altered, so as to form a repeating pattern of birefringent regions within the photopolymer.

The photopolymer 10 may then be cured, for example by exposure to heat or ultraviolet light, so as to stabilise the hologram within the film. Alternatively, further layers of a polymer or ultraviolet absorbing material may be deposited around the photopolymer 10 so as to prevent subsequent exposure at wavelengths which induce changes in the refractive index of the photopolymer.

The device shown in FIG. 1 may be used as a polarization selective mirror, as shown in FIG. 2. Unpolarized light 18 incident on the first side 6 of the photopolymer 10 passes in to the bulk of the photopolymer 10 where it interacts with the birefringent grating formed within the photopolymer.

Light 20 having a polarization orthogonal to the polarizations of the first and second beams 2 and 4 does not see a refractive index grating within the photopolymer 10, and consequently is transmitted through the mirror. However, light 22 having a polarization parallel with that of the first and second beams 2 and 4 sees a refractive index grating within the body of the photopolymer 10, and consequently is reflected from the mirror.

Devices may be fabricated to work with light having a predetermined angular range of incidence with the first side 6. FIG. 3 shows a device 26 which is arranged to receive unpolarized light 28 from a first direction and to split the unpolarized light into first and second polarised lights 30 and 32 having orthogonal polarizations and directed in second and third directions respectively.

Figure 5:
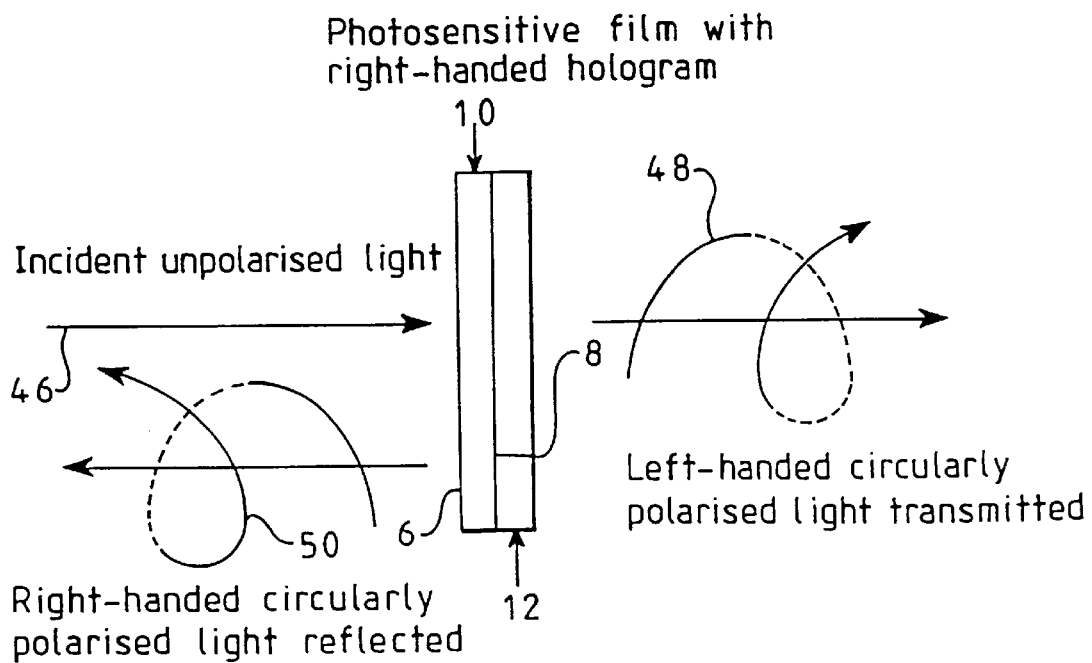
FIG. 5 schematically illustrates a polarization sensitive reflector constituting a further embodiment of the invention for use with circularly polarized light.

Devices primarily for use with circularly polarized light can also be formed as shown in FIG. 4. Coherent beams of light 40 and 42 having the same sense of circular polarization can be directed on to the first and second sides 6 and 8, respectively, of the photopolymer 10. The circularly polarized lights interfere so as to form an interference pattern within the photopolymer 10. Thus a repeating pattern of birefringent regions is formed within the photopolymer 10 as illustrated, for example, in FIG. 9. As described hereinbefore, the photopolymer may be cured so as to fix the pattern of birefringent regions therein. A device of the type shown in FIG. 4, recorded with right-handed circularly polarized light, may be used as a mirror to reflect right-handed circularly polarized light, as shown in FIG. 5. A beam of unpolarized light 46 is incident on the first side 6 of the device. The unpolarized light 46 enters the bulk of the photopolymer 10 where it interacts with the hologram recorded therein. The hologram resolves the unpolarized light into two orthogonal circularly polarized components. A left-handed circularly polarized light component 48 does not see a refractive index grating formed within the photopolymer 10, and consequently is transmitted. A right-handed circularly polarized light component 50 does see a refractive index grating formed within the birefringent photopolymer 10 and interacts with the grating and becomes reflected thereby.

A hologram recorded using circularly polarized light has properties similar to those of a cholesteric liquid crystal, in that at a wavelength matching pitch of the structure, one sense of circularly polarised light is strongly reflected whereas an opposite sense is transmitted.

A device may contain holograms recorded using linearly polarized light and holograms recorded using circularly polarized light. In addition, different spatial regions of the device may consist of holograms recorded with different linear or circular polarizations.

The behaviour of such refractive index gratings is highly wavelength dependent. The bandwidth of the reflectivity of a refractive index grating depends upon the thickness of the grating and the magnitude of the refractive index change. Gratings formed within a film having a thickness of 10 $\mu$m and a maximum birefringence of $\Delta n=0.05$ typically have a bandwidth of 25 nm. Consequently the hologram may be used as a polarizing colour filter.

Figure 6:
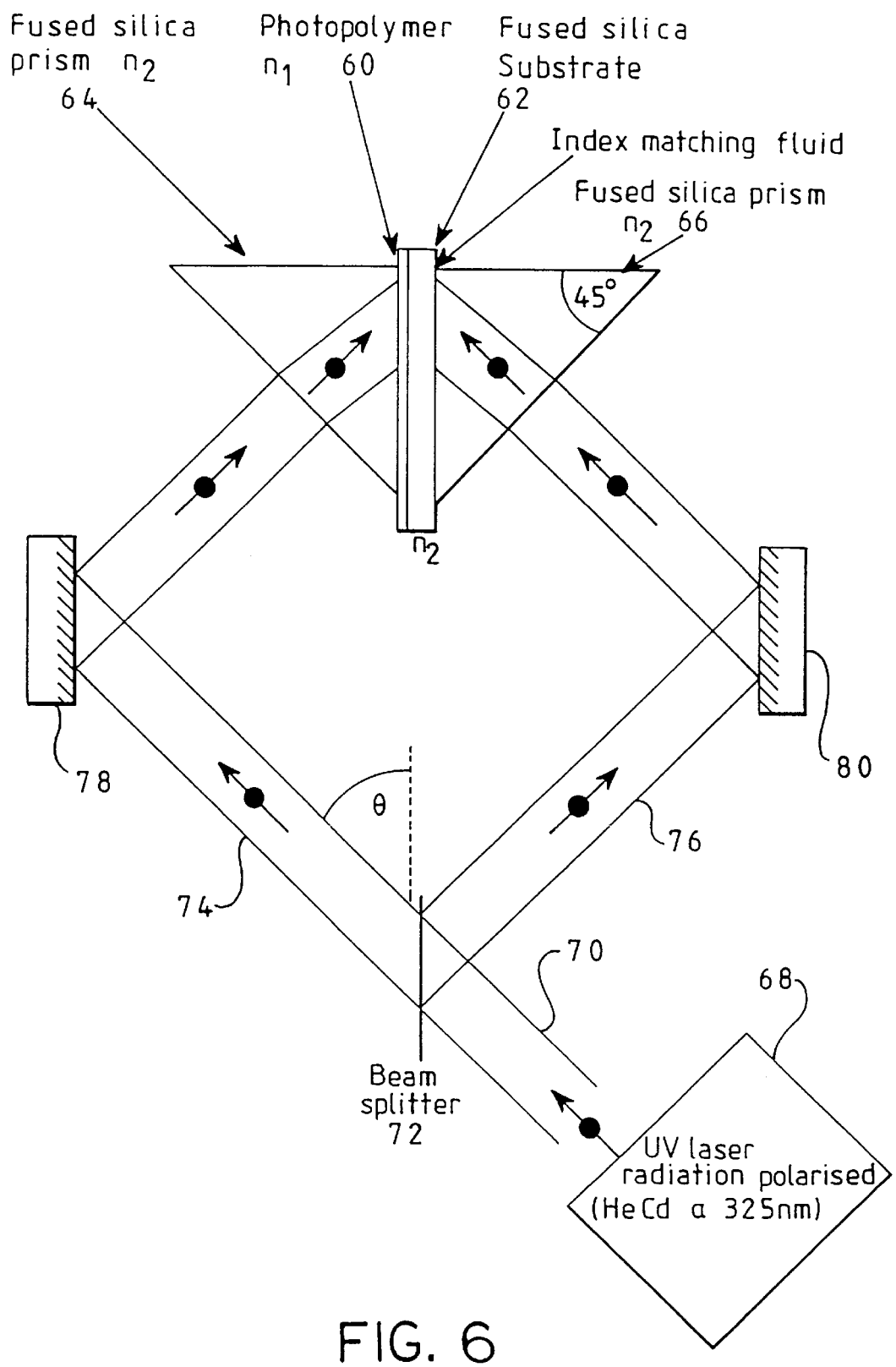
FIG. 6 is a schematic illustration of an arrangement for recording a holographic interference pattern.

The fabrication of a polarization selective mirror will now be described with reference to FIG. 6 of the accompanying drawings. A film 60 of PVMC or other material exhibiting photoinduced birefringence is deposited to a depth of 10 $\mu$m on a fused silica substrate 62. The film 60 may be deposited by spin-coating or by casting the film from a solution. The substrate 62, with the photopolymer on one side thereof, is sandwiched between first and second fused silica prisms 64 and 66, respectively. The unexposed photopolymer has a refractive index $n_1$, whereas the substrate 62 and prisms 64 and 66 have a refractive index $n_2$. Ideally $n_1$ is substantially equal to $n_2$. A refractive index matching fluid may be introduced between the prisms and the substrate and/or photopolymer so as to reduce or substantially eliminate refractive index changes at the interface between a prism and the substrate or photopolymer.

A laser light source 68 provides a linearly polarised beam of coherent light 70. The light 70 is directed towards a beamsplitter 72 which splits the light into first and second beams 74 and 76, respectively. Each beam 74 and 76 is reflected from a respective mirror 78 and 80 towards the first and second prisms 64 and 66, respectively. The prisms 64 and 66 are used when a recording wavelength, i.e. the wavelength of the light produced by the laser 68, is considerably shorter than the intended wavelength at which the mirror is to be used. The prisms allow an appropriate angle between the beams incident on the photopolymer to be achieved, such that an interference pattern having a predetermined spatial periodicity can be achieved as illustrated, for example, in FIGS. 9 and 10.

The beams 74 and 76 interfere within the bulk of the photopolymer 60 to create a pattern of interference fringes. In order to tune the mirror for use at a predetermined wavelength, the fringes must be created at a spacing corresponding to the design wavelength, reduced by the pre-exposure refractive index of the film of photopolymer 60. When the prisms 64 and 66 are 45 degree prisms and the refractive index $n_1$ of the photopolymer 60 is approximately equal to the refractive index $n_2$ of the prisms, then the half-angle $\theta$ between the beams 74 and 76 and the beamsplitter for a given write wavelength $\lambda_{write}$ and a given design wavelength $\lambda_{read}$, is given by $$\theta = 45° - \sin^{-1}\left\{ n\sin\left[ \cos^{-1}\left(\frac{\lambda_{write}}{\lambda_{read}}\right) - 45° \right] \right\}$$

Assuming that the pre-exposure refractive index of the photopolymer 60 and that of the fused silica substrate and the prisms are approximately equal at n=1.5, then the half angle $\theta$ for design wavelengths of 440, 550 and 620 nm corresponding to blue, green and red light, respectively, are:

| $\lambda_{read}$ | $\theta$ |
|---|---|
| 440 nm | 48.9° |
| 550 nm | 31.8° |
| 620 nm | 24.7° |

The recording light $\lambda_{write}$ in the above examples is provided by a HeCd laser having an output wavelength of 325 nm.

The photopolymer 60 is exposed until a required birefringence $\Delta n = n_e - n_o$, where $n_e$ and $n_o$ are the refractive indices along the extraordinary and ordinary directions of the birefringent film; is achieved. The birefringent material may be such that $n_e$ is greater or less than $n_o$. The appropriate exposure time may be determined either by pre-exposure calibration tests or by in-situ monitoring of the reflectivity of the hologram.

A diffraction efficiency $\eta$ is given by:

$$\eta = \tanh^2\left( \pi \cdot \frac{n}{\lambda} \cdot \frac{\Delta n d}{2} \right)$$

where:

$\lambda$=wavelength in the photopolymer
d=thickness of the photopolymer
n=average refractive index of the photopolymer
$\Delta n$ is as defined above.

For a film in which d=10 um, $\Delta n$=0.05 and n=1.5 and at a design wavelength of 550 nm, a reflectivity (diffraction efficiency) of 95% is achievable for one polarization state, whilst the orthogonal polarisation state sees no hologram and consequently undergoes substantially no reflection.

The film of photopolymer may be exposed using a step and repeat process such that different regions of the photopolymer are exposed at different times and/or at different design wavelengths and/or with different polarizations of light. One or more regions may be multiply exposed so as to form multiple holograms within that region.

When multiple holograms are written within a region of the device using linearly polarized light, the write beams for the second and subsequent holograms may undergo partial reflection from the first hologram if their polarization state is the same as that of the light used to write the first hologram. Such reflection may reinforce the writing of the second and subsequent holograms. If the polarisation of the write beams for the second hologram is orthogonal to that used to write the first hologram, the write beams do not interact with the first hologram.

It is thus possible to provide a compact and efficient polarization sensitive device which can be easily fabricated.

Figure 7:
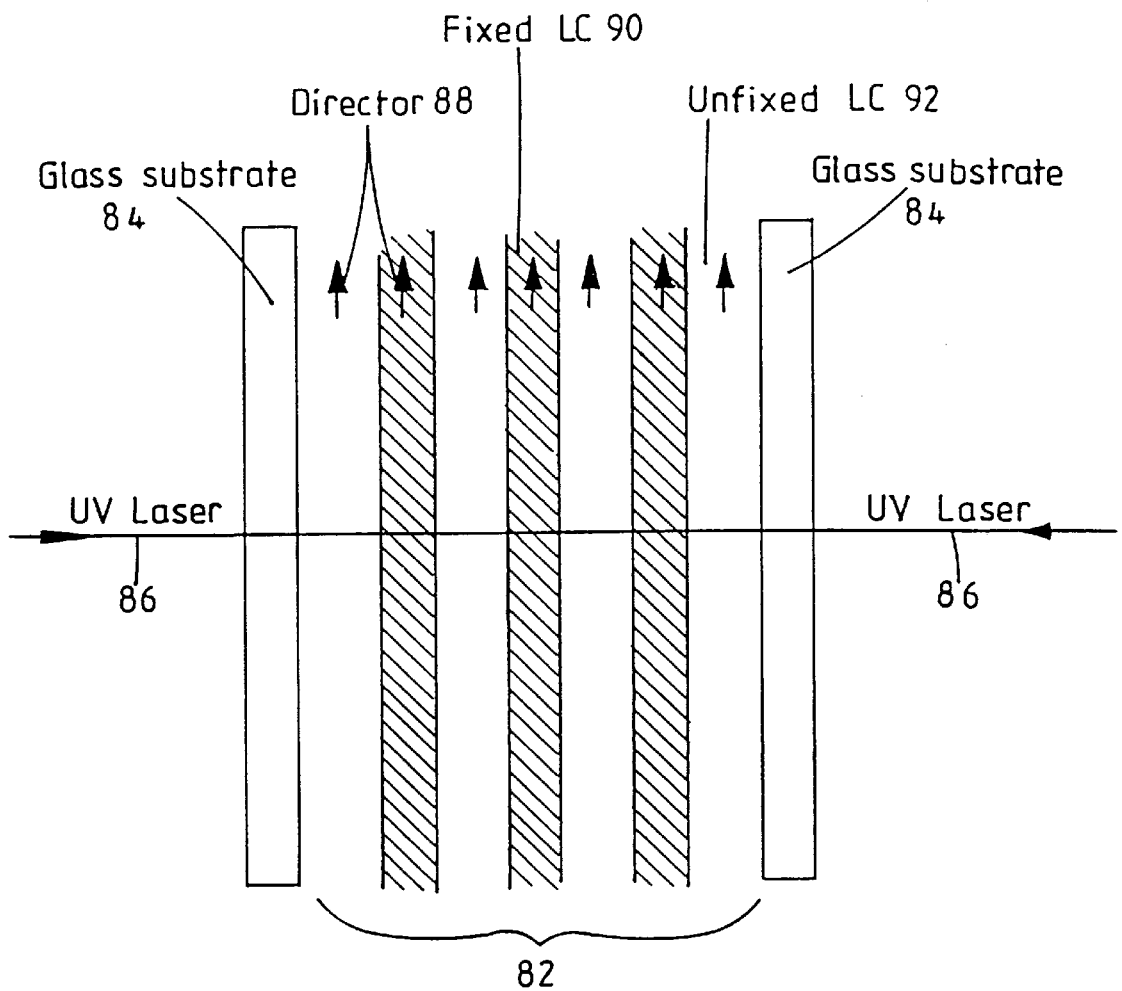
FIGS. 7 and 8 are schematic illustrations of some of the steps involved in a technique for recording a hologram in a liquid crystal polymer.
Figure 8:
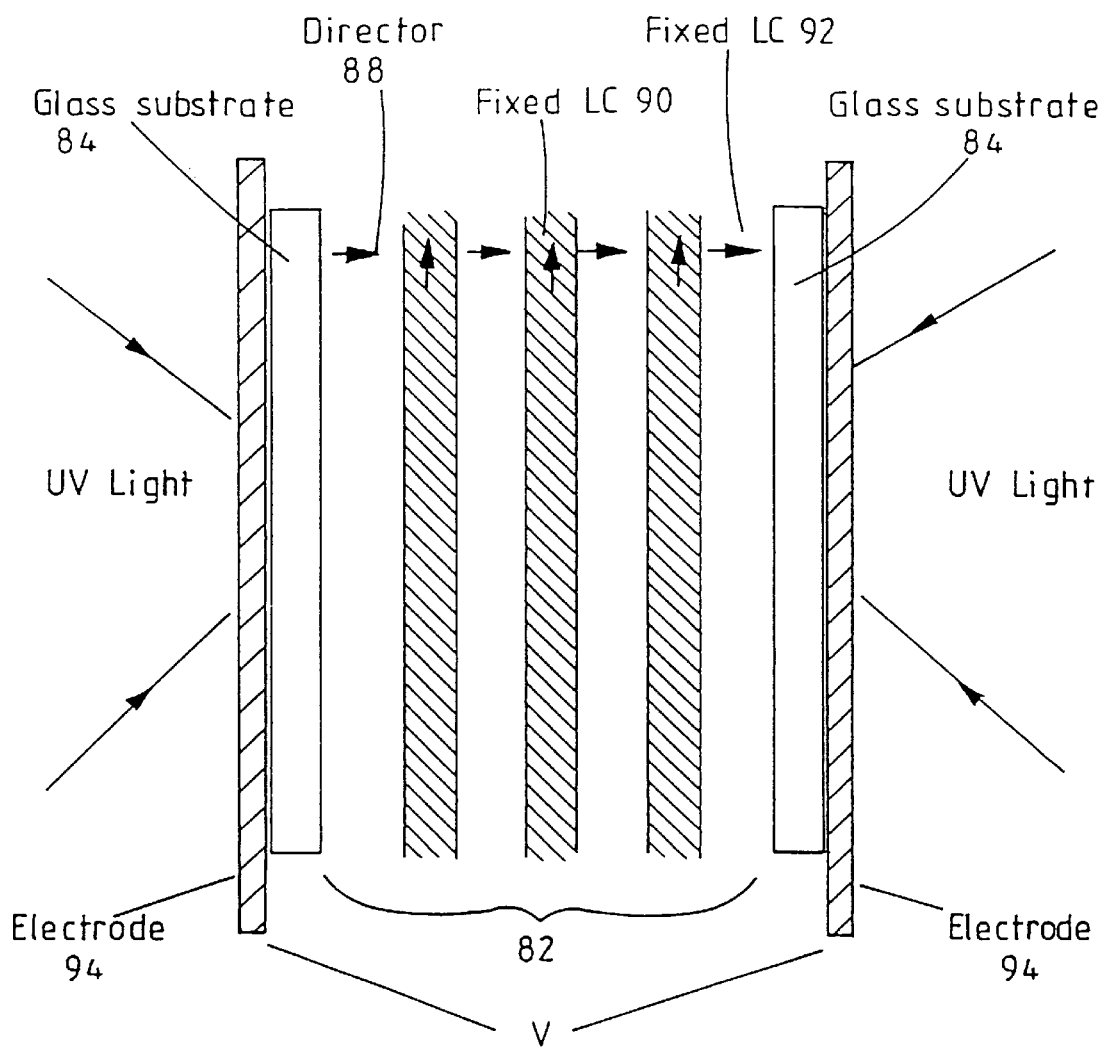

In the arrangement illustrated in FIGS. 7 and 8, an aligned liquid crystal polymer layer 82 is provided between a pair of glass substrates 84. The liquid crystal layer 82 is aligned using a suitable conventional technique, for example by providing the glass substrates 84 with rubbed polyimide alignment layers. The alignment layers may be arranged to cause the molecules of the liquid crystal material to align either in a direction parallel to the glass substrates 84, or alternatively in a direction perpendicular to the glass substrates 84.

Figure 9:
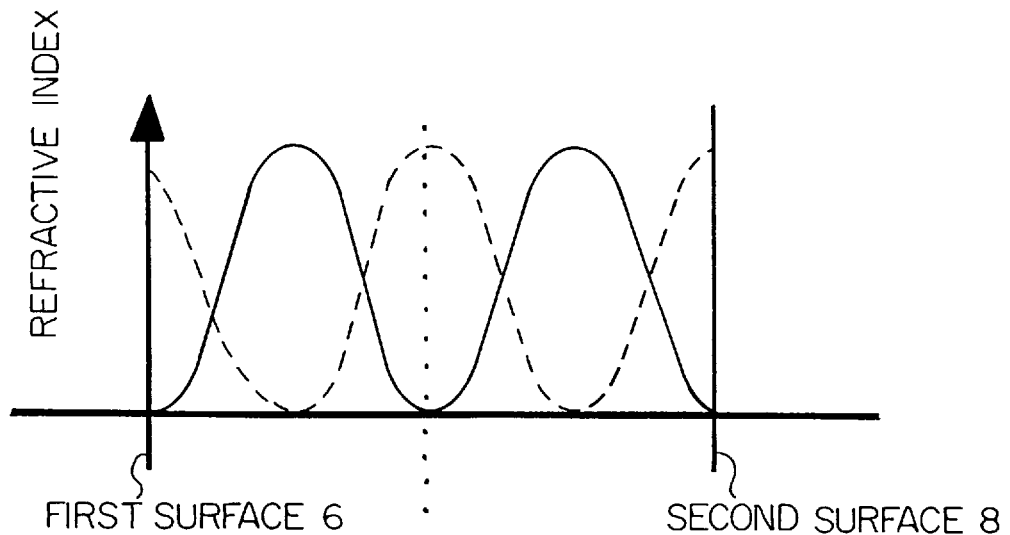
FIGS. 9 and 10 are graphical illustrations of the refractive index through the material.
Figure 10:
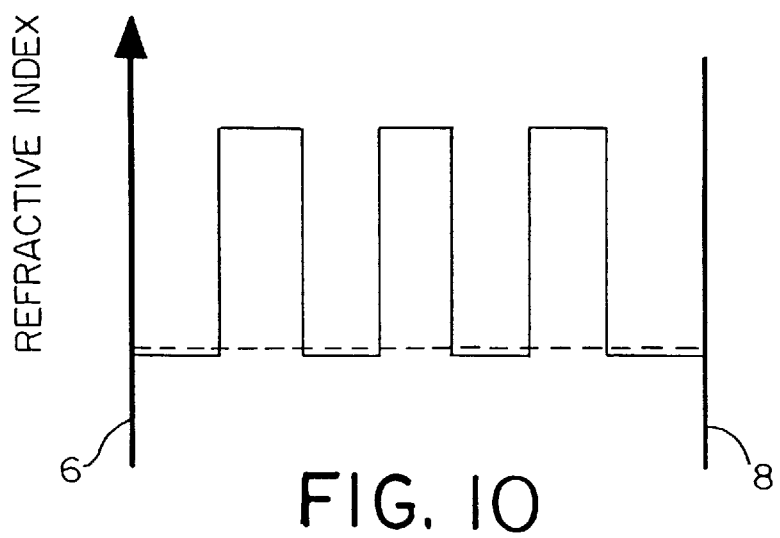

The liquid crystal layer 82 is irradiated from both sides by a pair of ultra-violet light beams 86 which interfere with one another to produce an interference pattern within the liquid crystal layer 82, the interference pattern extending substantially perpendicular to the glass substrates 84, the pattern comprising a series of fringes such as those illustrated in FIGS. 9 and 10. A suitable arrangement for irradiating the layer 82 is that illustrated in FIG. 6. It will be understood, therefore, that a similar technique is employed in writing the pattern as is used in the previously described method.

The irradation of the liquid crystal layer 82 causes cross-linking of the cross-linkable liquid crystal polymer chains in those regions 90 of the layer 82 where the interference pattern form bright fringes, but not in the regions 92 where the interference pattern results in cancellation. The regions 90 of the liquid crystal layer in which cross-linking occurs become fixed, the director 88 of such regions 90 no longer reorienting, for example, on the application of an electric field thereto.

In order to permanently fix the interference pattern in the liquid crystal layer 82, the regions 92 are fixed with the directors 88 of the molecules of the regions 92 being oriented differently to the directors 88 of the molecules of the regions 90. One technique for achieving this is illustrated in FIG. 8 wherein transparent electrodes 94 are provided adjacent the glass substrates 84, and a voltage V is applied across the electrodes 94 in order to reorientate the molecules of those parts of the layer 82 which are not fixed, i.e. the regions 92. Once the regions 92 have been reorientated, the liquid crystal layer 82 is irradiated with ultra-violet light of uniform intensity. Such irradiation completely cross-links the liquid crystal polymers in the unfixed regions 92 so that after the irradiation is complete, the liquid crystal layer 82 is fixed with the interference pattern forming a hologram therein.

It will be understood that the initial irradiation step is likely to result in some regions of the layer 82 being partially cross-linked, the extent of cross-linking being dependent upon the intensity of the light incident thereon. The subsequent reorientation and irradiation steps will result in the partially cross-linked regions being fully cross-linked. The resulting pattern fixed in the material may be a continuous pattern or a pattern including discontinuities.

In an alternative method, after the initial irradiation step, the liquid crystal layer 82 is heated to the isotropic phase and the layer 82 is uniformly irradiated to fully cross-link the unfixed regions 92 and any partially cross-linked regions.

Although the above described methods use cross-linkable liquid crystal polymers, liquid crystal monomers could be used, the irradiation steps polymerizing the liquid crystal monomers.

What is claimed is:

1. A polarization sensitive device comprising a liquid crystal material having a first surface, the material having been written so as to define a first repeating pattern of refractive index variation to light of a first polarization, the repeating pattern extending along a direction substantially perpendicular to the first surface.

2. A device as claimed in claim 1, wherein the material comprises a liquid crystal monomer material, the material having been written to at least partially polymerize the monomer material.

3. A device as claimed in claim 1, wherein the material comprises a liquid crystal polymer material, the material having been written to at least partially cross-link the polymer chains of the material.

4. A device as claimed in claim 1, wherein the material comprises a birefringent material.

5. A device as claimed in claim 4, wherein the birefringent material exhibits photoinduced birefringence.

6. A device as claimed in claim 5, in which the material is a photopolymer.

7. A device as claimed in claim 1, in which the material is a film.

8. A polarization sensitive device as claimed in claim 1, wherein unpolarized light which is incident on the material is resolved into a first and second orthogonal circularly polarized components and wherein the first circularly polarized component is transmitted through the material and the second circularly polarized component is reflected by the material.

9. A polarization sensitive device as claimed in claim 1, in which the refractive index of the material is a cyclicly varying continuous function.

10. A polarization sensitive device as claimed in claim 1, wherein the material comprises a liquid crystal material and the refractive index of the material to light is a cyclicly varying discontinuous function.

11. A polarization sensitive device as claimed in claim 8, in which the refractive index to light of the second polarization is substantially invariant with respect to displacement from the first surface.

12. A device as claimed in claim 1, wherein the first repeating pattern is a continuously varying pattern.

13. A device as claimed in claim 1, in which the device is patterned so as to define a plurality of regions having refractive index variations.

14. A device as claimed in claim 1, in which the material is formed on a substrate.

15. A device as claimed in claim 14, in which the substrate is fused silica.

16. A device as claimed in claim 1, in which the device has at least one further repeating pattern of refractive index variation to light of the first, second, or a further polarization, the at least one further pattern being substantially parallel to the first pattern.

17. A device as claimed in claim 16, wherein the at least one further pattern is superimposed upon the first pattern.

18. A device as claimed in claim 16, wherein the at least one further pattern is spatially separated from the first pattern.

19. A device as claimed in claim 1, wherein the pattern is written into the material using an optical writing technique.

20. A device as claimed in claim 19, wherein the optical writing technique involves a step of irradiation by ultra-violet light.

21. A polarization sensitive beamsplitter comprising a polarization sensitive device as claimed in claim 1.

22. A polarization sensitive reflector comprising a polarization sensitive device as claimed in claim 1.

23. A method for forming a polarization sensitive device, comprising the steps of optically writing a liquid crystal material having a first surface so as to define a first repeating pattern of refractive index variation to light of a first polarization, the repeating pattern extending along a direction substantially perpendicular to the first surface, fixing the pattern in the liquid crystal material, and a subsequent fixing step for fixing the remaining liquid crystal material.

24. A method as claimed in claim 23, wherein the step of optically writing comprises irradiating the liquid crystal material with ultra-violet light of spatially varying intensity.

25. A method as claimed in claim 24, wherein the irradiation is achieved using at least two ultra-violet light beams arranged to interfere with one another to produce the spatially varying intensity.

26. A method as claimed in any one of claim 23, wherein the subsequent fixing step comprises a step of reorienting the alignment of any part of the liquid crystal which is not already fixed, and a step of irradiating the liquid crystal material with light of substantially uniform intensity.

27. A method as claimed in claim 26, wherein the step of reorienting the liquid crystal material comprises heating the material to the isotropic phase.

28. A method as claimed in claim 26, wherein the step of reorienting the liquid crystal material comprises applying an electric field across the liquid crystal material.

29. A method as claimed in claim 23, wherein the liquid crystal material comprises a photo-polymerizable liquid crystal monomer material.

30. A method as claimed in claim 23, wherein the liquid crystal material comprises a photo-cross-linkable liquid crystal polymer material.

31. A method as claimed in claim 23, in which at least one region of the device is multiply exposed so as to form a plurality of patterns therein.

32. A method of forming a polarization sensitive device, comprising illuminating first and second substantially parallel surfaces of a photosensitive material exhibiting photo-induced birefringence with first and second polarized coherent radiations, respectively, so as to define a first pattern of spatial variation in refractive index in the photosensitive material in accordance with an interference pattern between the first and second radiations, wherein the photosensitive material is subsequently deformed so as to change the spatial periodicity of the pattern of refractive index variation.

33. A method as claimed in claim 32, in which selected regions of the photosensitive material are illuminated with the first and second radiations so as to pattern the device.

34. A method as claimed in claim 32, in which the angle of incidence between the first and second surfaces and the first and second radiations, respectively, is selected so as to define the first pattern of spatial variation with a predetermined spatial periodicity.

35. A method as claimed in claim 32, in which the polarized coherent radiations are light.

\* \* \* \* \*